Patented Mar. 14, 1950

2,500,444

UNITED STATES PATENT OFFICE 2,500,444

URAMIDOHOMOMEROQUINENE

Robert Burns Woodward, Cambridge, Mass., and William von Eggers Doering, New York, N. Y., assignors to Polaroid Corporation, Cambridge, Mass., a corporation of Delaware No Drawing. Application October 10, 1944,
Serial No. 558,080

1 Claim. (Cl. 260—294)

This invention relates to the synthesis of quinine and cinchona-like alkaloids.

The present application is a continuation-in-part of our copending applications Serial No. 508,-954, filed November 4, 1943, now Patent No. 2,475,-932, entitled "7-hydroxyisoquinoline derivatives and method of preparing the same," and Serial No. 523,940, filed February 25, 1944, now Patent No. 2,395,526, entitled "Isoquinoline derivatives and methods of preparing the same."

It is one object of the present invention to provide a novel process of synthesizing homomeroquinene from isoquinoline derivatives.

Another object is to provide novel quinine and cinchona-like alkaloids, and particularly alkaloids having the structural formula of quinine and quinotoxine, derived from 1-cis-homomeroquinene and racemic-cis-homomeroquinene and from one of the trans-homomeroquinenes.

Still another object is to provide novel 7-hydroxyisoquinoline derivatives and specifically the N - acetyl - 10 - aminodihydrohomomeroquinene ethyl esters, the salts of said esters, the N-acetyl-10 - trimethylammonium - dihydrohomomeroquinene ethyl ester iodides and uramidohomomeroquinenes.

According to the method of the present invention, 7-hydroxyisoquinoline

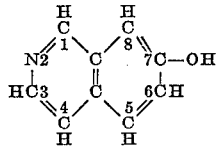

is transformed to 7-hydroxy-8-methylisoquinoline and the latter is converted to its tetrahydro derivative, 1,2,3,4 - tetrahydro - 7 - hydroxy - 8 - methylisoquinoline, from which the N-acetyl derivative, 2 - acetyl-1,2,3,4 - tetrahydro - 7 - hydroxy - 8 - methylisoquinoline, having the formula

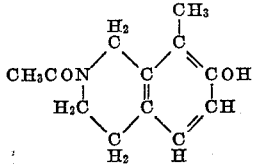

is obtained. The latter product is then converted into a mixture of stereoisomers of 2 - acetyl - 7 - hydroxy-8-methyldecahydroisoquinoline having the formula

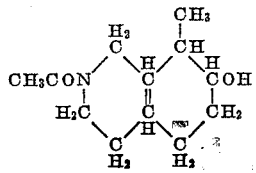

which stereoisomers may be isolated as chemical individuals and then subjected to further transformation. It is preferable, however, instead of isolating the stereoisomers from their mixture, to oxidize the latter and thus form a mixture of the corresponding ketones, i. e., the stereoisomers of 2 - acetyl - 7 - keto - 8 - methyldecahydroisoquinoline, and to isolate from the latter mixture the stereochemically homogeneous products. The carbocyclic ring of each stereoisomeric ketone may then be cleaved to give the corresponding N-acetyl - 10 - oximinodihydrohomomeroquinene ethyl ester having the formula

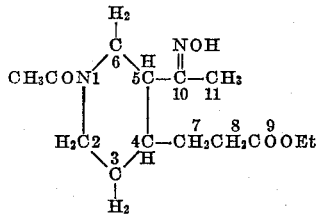

The latter compound is catalytically hydrogenated to transform the oximino group to an amino group. The hydrogenation may be carried out without a solvent to give the corresponding amino ester, but is preferably performed in an acidic solvent, such as acetic acid, whereby the corresponding amino salt, N - acetyl - 10 - aminodihydrohomomeroquinene ethyl ester acetate, having the formula

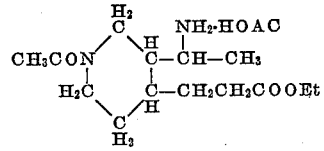

is formed. The amino compound is methylated, for example with methyl iodide, to give N-acetyl - 10 - trimethylammoniumdihydrohomomeroquinene ethyl ester iodide having the formula

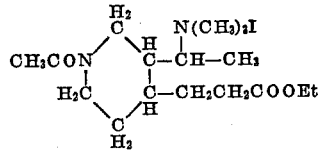

which can be decomposed to homomeroquinene, the latter being isolated as its uramido derivative.

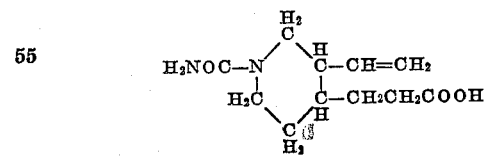

The uramidohomomeroquinene is hydrolyzed to obtain the free racemic homomeroquinene

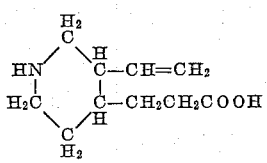

The racemic homomeroquinene thus obtained will have a cis or trans configuration, depending upon the configuration of the stereoisomer of 2-acetyl-7-keto-8-methyldecahydroisoquinoline from which the homomeroquinene is synthesized. Either of these racemic mixtures of homomeroquinene can be converted by esterification and benzoylation to N-benzoylhomomeroquinene ethyl ester, and the latter can be condensed with ethyl quininate, as by following the general methods of Rabe disclosed in Berichte der Chemischen Gesellschaft 51, 1360 (1918); ibid., 52, 1842 (1919), and of Prostenik and Prelog disclosed in Helvetica Chemica Acta, 26, 1965 (1943), to form the corresponding racemic mixtures having the structural formula of quinotoxine. The l- and d-isomers of these quinotoxine-like compounds may be resolved, as for example, by means of dibenzoyl-d-tartaric acid, d-quinotoxine-dibenzoyl-d-tartrate being less soluble in water than l-quinotoxine-di-dibenzoyl-d-tartrate. From any of these isomers, or either of the racemic mixtures thereof, the corresponding cinchona-like alkaloids having the structural formula of quinine, including the novel racemic quinine and d-quinine, may be obtained, for example, by means of the conversion reported by Rabe in Berichte der Chemischen Gesellschaft, 51, 466 (1918). To make d-quinine the starting material is l-quinotoxine which is converted to a mixture of stereo-isomeric quinines according to the method described by Rabe and analogous to the method described herein, followed by resolution of the optical isomers to give d-quinine. The l-quinotoxine is employed to make d-quinine.

The method of the present invention is preferably carried out with 7-hydroxyisoquinoline as the starting material and the latter is reacted with formaldehyde and a compound from the class consisting of primary and secondary amines, these ingredients being preferably mixed in a hydroxylic solvent, such as ethanol, methanol and water, or in a mixture of said solvents, as for example, aqueous ethanol and aqueous methanol. The formaldehyde may be obtained from any suitable source and may be conveniently introduced into the reaction mixture in aqueous solution. The primary or secondary amine may, for example, be any one of the following: piperidine, morpholine, aniline and its homologues, and the alkyl and dialkyl amines, such as methylamine, ethylamine, dimethylamine, diethylamine, methylethylamine, propylamine, dipropylamine, methylpropylamine, ethylpropylamine, ethylbutylamine, isopropylbutylamine, as well as aryl substituted derivatives of said alkyl and of said dialkyl amines. The completely aromatic secondary amines, as for example diphenylamine, and the aromatic heterocyclic amines such as indole and thiazole, are less preferred than the non-aromatic heterocyclic secondary amines, such as morpholine and piperidine and the non-cyclic amines having at least one alkyl group attached to the nitrogen, such as the alkyl and dialkyl amines.

The product of the above reaction comprises a 7-hydroxyisoquinoline derivative having an N-substituted-aminomethyl group, i. e., —CH$_2$—N<, attached to the eight position of the isoquinoline ring, the specific amino substituent depending on the one of the primary and secondary amines which is used as a reaction ingredient. The 7-hydroxy-8-N-substituted aminomethylisoquinoline is thereafter reduced by reacting said product with an alkali methoxide, such as sodium methoxide or potassium methoxide, preferably in a hydroxylic solvent, such as methanol. The reduction may be carried out in an autoclave and preferred temperature and time ranges therefor are between 200 and 250° C. and from six to sixteen hours. The reaction products comprise the alkali salt, e. g., the sodium or potassium salt, of 7-hydroxy-8-methylisoquinoline, and said salt is neutralized by acidification to free the 7-hydroxy-8-methylisoquinoline, the latter compound being thereafter isolated from the reaction products, preferably by sublimation and crystallization.

The 7-hydroxy-8-methylisoquinoline may be purified, for example, by forming the oxalate of said compound, crystallizing said oxalate and then liberating the pure 7-hydroxy-8-methylisoquinoline.

The 7-hydroxy-8-methylisoquinoline is hydrogenated over a suitable catalyst, as for example platinum, being thus smoothly and quantitatively converted to the tetrahydro-derivative, 1,2,3,4-tetrahydro-7-hydroxy-8-methylisoquinoline. It is to be expressly understood that while platinum is the preferred catalyst for this purpose, other hydrogenation catalysts, such as nickel, may be employed. The tetrahydro-derivative is thereafter converted into the corresponding N-acetyl-derivative, 2-acetyl-1,2,3,4-tetrahydro-7-hydroxy-8-methylisoquinoline, by reaction with acetic anhydride in ethanol and this N-acetyl-derivative is hydrogenated, as for example, over Raney nickel to give a practically quantitative yield of a mixture of stereoisomers of 2-acetyl-7-hydroxy-8-methyldecahydroisoquinoline. A certain proportion of each of the stereoisomers in this reaction mixture can be isolated as a chemical individual and when so isolated may thereafter be subjected to the following transformation in the pure form. However, it is preferable to oxidize the crude mixture of the stereoisomers to produce the corresponding stereoisomeric ketones, since this process reduces by one the number of asymmetric centers in the molecule. From the mixture of ketones thus obtained the crystalline stereochemically homogeneous cis ketone may be isolated as a hydrate. This form of stereochemical individual has the same configuration as the corresponding atoms of the quinine molecule.

The stereoisomer of 2-acetyl-7-keto-8-methyldecahydroisoquinoline thus obtained is cleaved between the 7- and 8-positions of its carbocyclic ring to give the N-acetyl-10-oximinodihydrohomomeroquinene ethyl ester. The cleavage is accomplished by reacting the ketone with ethyl nitrite and sodium methoxide, best results being obtained during this step of the process by excluding moisture from the reaction. To accomplish this all of the materials are preferably purified just prior to use and are handled in vessels equipped, for example, with calcium chloride tubes in order to obtain a complete exclusion of moisture. A rigid exclusion of moisture is also effected during the reaction.

The N-acetyl-10-oximinodihydrohomomeroquinene ethyl ester is then catalytically hydrogenated, for example, in the presence of platinum, and in a suitable solvent, preferably an acidic solvent, such as acetic acid, to give the corresponding salt of the amino ester, as for example, N - acetyl - 10 - aminodihydrohomomeroquinene ethyl ester acetate. The acetic acid is preferably at least partially removed after this reduction and care is taken during the removal to avoid condensation between the amino and the ester groups between or within molecules. A satisfactory method of carrying out the removal is by distilling off the acetic acid in vacuo at room temperature.

The N-acetyl-10 - aminodihydrohomomeroquinene ethyl ester acetate in pure form, or in mixture with a slight amount of acetic acid, is then treated with a weak base, preferably potassium carbonate, and with a methylating agent, such as methyl iodide, in alcohol solution and this reaction mixture is refluxed for a sufficient time to effect complete methylation. The product of the reaction, N - acetyl - 10 - trimethylammoniumdihydrohomomeroquinene ethyl ester iodide, is then isolated, the excess potassium carbonate and potassium iodide being removed, for example, by filtration, and the alcohol being removed, for example, by distillation in vacuo. To remove the inorganic salts the residue is taken up in chloroform. To insure purification the procedure may be repeated.

The N - acetyl - 10 - trimethylammoniumdihydrohomomeroquinene ethyl ester iodide is then decomposed to the sodium salt of homomeroquinene, as for example, by being heated with concentrated sodium hydroxide solution. The reaction starts at 140° to 200° C. and evolves trimethylamine. When trimethylamine is no longer evolved, the immiscible sodium hydroxide aqueous layer is mechanically separated from the semisolid mass of organic material which consists principally of the sodium salt of homomeroquinene, the separation being preferably performed while the materials are still hot. The decanted material is dissolved in water and the solution is brought to neutrality by the addition of acid. Potassium cyanate is then added, preferably in slightly more than equivalent quantity, and the solution is heated for a short time, for example, 20 to 30 minutes. It is then cooled and acidified to Congo, crystallizing out uramidohomomeroquinene which has a melting point of 165.2° to 165.8° C.

The uramidohomomeroquinene is then hydrolyzed, as by boiling, with hydrochloric acid to give the racemic homomeroquinene hydrochloride and ammonium chloride, which mixture is worked up in the usual way to obtain the free racemic homomeroquinene having a melting point of 215° C.

The racemic-cis-homomeroquinene thus obtained may be converted by esterification and benzoylation to benzoylhomomeroquinene ethyl ester and condensed with ethyl quininate by the methods of Rabe or Prostenik and Prelog to form racemic-cis-quinotoxine. The optical isomers of this racemic mixture of quinotoxines may be resolved by means of dibenzoyl-d-tartaric acid, d-quinotoxine - dibenzoyl - d - tartrate being less soluble in water than l-quinotoxine-dibenzoyl-d-tartrate. Either of the optical isomers of quinotoxine or their racemic mixture may be transformed to the corresponding compounds having the structural formula of quinine including the novel d-quinine and dl-quinine, the transformation being carried out, for example, by the method disclosed by Rabe in Berichte der Chemischen Gesellschaft, 51, 466 (1918).

The above synthesis, starting with the hydrate of 2 - acetyl - 7 - keto - 8 - methyldecahydroisoquinoline, relates to materials having a cis configuration. It is to be understood, however, that the stereoisomer of 2-acetyl-7 - keto - 8 - methyldecahydroisoquinoline, having a trans configuration, may also be subjected to a similar synthesis to give the trans forms of homomeroquinene and the corresponding quinotoxine-like compounds, i. e., compounds having the structural formula of quinotoxine, and quinine-like compounds, i. e., compounds having the structural formula of quinine.

The following examples are given to illustrate the novel processes of the present invention whereby the novel products of the invention are obtained, but it will be understood that the invention is not limited to the details given therein except as indicated by the appended claim.

*Example 1*

Twenty grams of 7-hydroxyisoquinoline are dissolved in 500 c. c. of boiling methanol containing 12 grams of piperidine. To the cooled solution are added fourteen grams of 35% Formalin solution. After standing for two and one-half hours at room temperature, the solvent is blown off and the residual oil is dried in vacuo. The dried oil is taken up in 550 c. c. of absolute methanol and one hundred thirty grams of sodium methoxide are added. The solution is heated in the autoclave at 220° C. for twelve hours.

The reaction mixture is diluted with 40 c. c. of water and partially neutralized with 150 c. c. of concentrated hydrochloric acid. The solution is boiled down to 400 c. c. at which time 300 c. c. additional water is added and boiling is continued till the vapors no longer burn. The cooled solution is neutralized with hydrochloric acid and buffered with sodium bicarbonate. The precipitate of 7-hydroxy-8-methylisoquinoline is collected and dried.

The crude material is sublimed and the sublimate is dissolved in 400 c. c. of methanol. After concentrating the solution to 200 c. c. and cooling, 10.3 grams of shiny platelets of 7-hydroxy-8-methylisoquinoline having a melting point of from 230 to 232° C., are obtained.

*Example 2*

Ten grams of 7-hydroxy-8-methylisoquinoline and 0.50 gram of platinum oxide are suspended in 100 c. c. of glacial acetic acid. After shaking for three hours with 60 lbs. of hydrogen, the theoretical quantity of hydrogen is taken up. No additional hydrogen is taken up on shaking for a longer time. The catalyst is removed by filtration and the solvent by distillation in vacuo. The product remaining is dissolved in 100 c. c. of methanol and treated with 8.0 c. c. of acetic anhydride. A first crop of 11.4 grams of pure 2-acetyl-1,2,3,4 - tetrahydro-7-hydroxy-8-methylisoquinoline, having a melting point of from 187 to 198° C., is obtained. A second crop of .9 gram is obtained on concentrating the mother liquor. The total yield is 94.5% of the theoretical.

*Example 3*

Four grams of 2-acetyl-1,2,3,4-tetrahydro-7-hydroxy-8-methylisoquinoline and three grams of Raney nickel catalyst are suspended in 20 c. c. of absolute ethyl alcohol and hydrogenated at a starting pressure of 3000 lbs. for ten hours at 150° C.

On cooling, the solution is washed from the vessel and filtered. Evaporation to dry gives an oil which is a mixture of the stereoisomers of 2-acetyl-7-hydroxy-8-methyldecahydroisoquinline.

The oil is dissolved in 40 c. c. of glacial acetic acid and cooled to —5° C. To the solution is added a solution of 1.50 grams of chromic anhydride in 5 c. c. of water and 20 c. c. of acetic acid also cooled to —5° C. A dark brown precipitate appears which dissolves slowly at the ice bath temperature after three hours. The reaction mixture is then allowed to stand at room temperature for six hours and then heated at 50° C. for three more.

The acetic acid is removed in vacuo. The residual oil is shaken vigorously with 100 c. c. of ether. The chromic salt precipitate and the ether solution is decanted. The chromic salts are then dissolved in 10 c. c. of methyl alcohol; to the solution 200 c. c. of ether are added with vigorous shaking. The supernatant solution is united with the first ether extraction.

Evaporation of solvent leaves an oil containing small amounts of chromic salts. The oil is distilled in a modified Hickman still. 2.50 grams of colorless oil are obtained. It is analytically pure 2-acetyl-7-keto-8-methyldecahydroisoquinoline. It is dissolved in an equal volume of ether. 0.20 gram of water is added with shaking. On seeding with the crystalline ketone-hydrate, 1.00 gram of pure ketone-hydrate, having a melting point of 82° C., is obtained. The mother liquor containing other stereoisomers is saved. The ketone-hydrate is boiled with benzene until no more water is driven off and then the benzene is completely evaporated to give the anhydrous ketone.

Example 4

3.75 grams of 2-acetyl-7-keto-8-methyldecahydroisoquinoline hydrate, obtained in accordance with the process of Example 3, are dehydrated by boiling with benzene. The freshly obtained anhydrous ketone, whose dryness is thus assured, is then dissolved in a small amount of absolute alcohol, which is freshly distilled, for example, from magnesium ethoxide, in order to be completely dry.

3.84 grams of metallic sodium are also dissolved in dry absolute alcohol and then mixed with the solution of the ketone. The mixture is cooled to 0° C., and there is added to the mixture 1.24 grams of ethyl nitrite, which is preferably freshly prepared and freshly distilled after being dried over potassium hydroxide. The reaction mixture is then allowed to stand in a cold room, for example at a temperature of 5° C., with precautions taken to exclude moisture. There may be added to the mixture, at predetermined intervals, small quantities of freshly prepared ethyl nitrite to replace any ethyl nitrite which may be lost by evaporation.

After the mixture has stood for eighteen hours, carbon dioxide is passed in for approximately three hours, the precipitate is filtered off, and the solution is decolorized by treatment with charcoal. The solution is then evaporated to dryness, ether is added, and the mixture is again evaporated to dryness. The dry residue is dissolved in 10 c. c. of ether and 2.62 grams of crystalline N-acetyl-10-oximinodihydrohomomeroquinene ethyl ester separated from the liquid. From the mother liquor a further group of crystals is obtained. The crystals have a melting point of 94° to 96° C. and can be recrystallized from ether.

Example 5

1.00 gram of N-acetyl-10-oximinodihydrohomomeroquinene ethyl ester is placed, together with 0.300 gram of platinum oxide catalyst, in 30 c. c. of glacial acetic acid (purified by distillation over potassium permanganate) and hydrogenated at atmospheric pressure or a pressure up to three to four atmospheres. In twenty to forty hours the hydrogenation is completed, the reaction taking up the theoretical two moles of hydrogen (plus that required for reduction of the catalyst).

The platinum catalyst is removed by filtration and the acetic acid solution distilled in vacuo at 25 to 30° C. until a syrup of the N-acetyl-10-aminodihydrohomomeroquinene ethyl ester acetate remains. No attempt need be made to remove the last excess of acetic acid, and the syrup may be immediately taken up in 50 c. c. of commercial absolute ethyl alcohol and methylated.

Example 6

The alcoholic solution of the N-acetyl-10-aminodihydrohomomeroquinene ethyl ester acetate is poured over 15 grams of commercial anhydrous potassium carbonate, five grams of methyl iodide (freshly purified by distillation over mercury) are added, a reflux condenser fitted, and the mixture refluxed over a free flame. Another ten grams of potassium carbonate are added after about tweny-four hours, and another fifteen to twenty grams of methyl iodide in five gram portions in intervals over forty-eight hours, at which time the reaction is completed.

The reaction mixture is filtered to remove the bulk of inorganic salts, and the ethyl alcohol is removed by distillation in vacuo at 40° C. The residue is eluted with about 50 c. c. of chloroform and again filtered to remove the last traces of inorganic salts. The chloroform is removed in vacuo at 40 to 100° C. leaving a hard, yellow glass of N-acetyl-10-trimethylammoniumdihydrohomomeroquinene ethyl ester iodide. The yield is 1.45 grams (94% of the theoretical).

Example 7

The glass of the 1-acetyl-10-trimethylammoniumdihydrohomomeroquinene ethyl ester iodide is dissolved in 2 c. c. of water, transferred to a platinum crucible together with 2.5 c. c. of a 5:4 sodium hydroxide aqueous solution, and gradually heated to 180° C. with vigorous stirring (silver spatula). Trimethylamine is copiously evolved and the reaction is completed in one to two hours. Another c. c. of water is added in intervals during the heating to maintain the reaction mixture in the liquid phase. When trimethylamine is no longer evolved the lower, the immiscible, sodium hydroxide aqueous layer is removed, while still hot, by pipette, leaving the semisolid mass of light brown homomeroquinene sodium salt behind.

This material is taken up in two to three c. c. of water, transferred to a small flask, and neutralized to pH 7 with concentrated hydrochloric acid. The solution is clarified by boiling five to ten minutes with active charcoal and filtered. A solution of 0.35 gram of potassium cyanate in 1 c. c. of water is added and the reaction solution gently warmed on the steam bath for thirty minutes, then removed and acidified to Congo red with concentrated hydrochloric acid. On further cooling in an ice bath, and scratching, colorless crystals of uramidohomomeroquinene separate. These are filtered, washed with one or two small portions of cold water and dried.

The yield is 0.30 gram (38% of the theoretical from the N-acetyl-10-oximinodihydrohomomeroquinene ethyl ester). The crystals have a melting point of 166° C.

*Example 8*

Eighty milligrams of crystalline uramidohomomeroquinene are heated under reflux with 13 c. c. of 0.1 normal hydrochloric acid for thirty-six hours. After removal of excess hydrochloric acid, the crystalline residue, consisting of dl-homomeroquinene hydrochloride and ammonium chloride, may be worked up directly by treatment with silver oxide followed by hydrogen sulfide to obtain the free dl-homomeroquinene, having a melting point of 215° C. Alternately, the mixture of chlorides may be separated by treatment with hot absolute alcohol, in which the dl-homomomeroquinene hydrochloride alone is soluble, and from which the pure crystalline material may be recovered on evaporation. The yield in the cleavage reaction is quantitative.

*Example 9*

After the removal of the hydrochloric acid in the method outlined in the preceding example, instead of isolating homomeroquinene the crude hydrochloride remaining is converted directly into its ethyl ester by evaporating three times with about 4% absolute ethanolic hydrogen chloride (6.5 g. dry hydrochloride in 153 g. alcohol). The residue is treated with 20 cc. of warm chloroform, the undissolved ammonium chloride being washed several times with 5–10 cc. portions of warm chloroform. The weight of dry ammonium chloride is 0.62 g. (theoretical unit=0.60 g.). 7 g. of anhydrous potassium carbonate are made into a mush with 3.5 cc. of water (1.7 cc. excess over the quantity necessary to convert the anhydrous carbonate into $K_2CO_3 2H_2O$). The combined chloroform extracts containing the homomeroquinene ester hydrochloride are poured over the carbonate mush, and stirred vigorously and boiled under reflux for one-half hour. To the cooled reaction mixture, 2.0 cc. of freshly distilled benzoyl chloride (2.4 g.=50% excess over the theoretical amount) in 4 cc. chloroform are added dropwise during ten minutes. The reaction mixture, which warms somewhat spontaneously, is then boiled under reflux with vigorous stirring for about two hours. The chloroform solution is decanted, the inorganic salts are washed with chloroform, and the combined chloroform extracts are evaporated to small volume and transferred to the molecular still. The remainder of the chloroform is removed, and the still is left under a water-pump vacuum for seven hours at 50° C. to remove the last traces of low-boiling material. The still is then put on a high vacuum pump, and the temperature is raised gradually. The following fractions are taken:

*Fraction I.*—0.08 g. of red oil is carried over mechanically before start of molecular distillation, during removal of chloroform.

*Fraction II.*—0.07 g. of crystals and oil is washed from cold finger. There is a strong odor of benzoyl chloride.

*Fraction III.*—0.33 g. of crystals and oil is washed from cold finger. The odor of benzoyl chloride is quite strong. After solution in ether, extraction with aqueous $K_2CO_3$, and evaporation gives 0.24 g. clear oil.

*Fraction IV.*—0.11 g. in which no crystals are evident is obtained. Benzoyl chloride odor is very faint. This is taken at about 129° C. and at a pressure of 0.2 to 1.1 mm.

*Fraction V.*—2.87 g. of absolutely clear, colorless, odorless heavy viscous liquid are obtained.

Fraction V is taken during eight to nine hours and the bath temperature rises very gradually during this time from 134° C. (initial) to 145° C. (final), while the pressure falls from 0.08 mm. (initial) to 0.01 mm. (final).

2.70 grams of N-benzoylhomomeroquinene ethyl ester (0.0086 mole) from fraction V are mixed with 4.0 g. of ethyl quininate (0.0173 mole=100% excess). 1.4 g. of absolutely dry pulverulent sodium ethoxide (0.0207 mole=140% excess, based on N-benzoylhomomeroquinene ethyl ester) is added, and the reaction mixture is heated to about 80° C. with continuous stirring. As the ethyl quininate melts, and the materials become thoroughly mixed, the initial yellow color changes to brown and then gradually to deep red. The reaction mixture is maintained at about 82° C. for fourteen hours with continuous stirring. It is then cooled, and the resulting very hard, dark red mass is decomposed with ice water and benzene. The (not entirely clear) combined aqueous layers are extracted with a small amount of ether. The clear, deep red, aqueous layer is then made just acid to litmus. The precipitated oil is taken up in ether. Evaporation of solvent, finally in vacuo, gives 2.56 g. of a red glass. The combined benzene and ether extracts from above, containing largely neutral material, are extracted with 10% aqueous sodium hydroxide. The alkaline extract is made just acid to litmus, and extraction with ether followed by removal of solvent gives a further small quantity of β-ketoester, 0.16 g.

Total weight of N-benzoylquinotoxine carboxylic acid ethyl ester thus obtained was 2.72 g., equivalent to 63.4% of the theoretical.

2.72 grams of N-benzoylquinotoxine carboxylic acid ethyl ester are dissolved in 30 cc. of 1:1 aqueous hydrochloric acid (from 15 cc. concentrated hydrochloric acid and 15 cc. water). The clear, reddish-orange solution is then boiled under reflux for four hours. The very dark reddish-brown solution is extracted with ether (from this extract 0.50 g. of benzoic acid is obtained on evaporation). The aqueous solution is then made strongly alkaline, and extracted with ether. 0.23 g. of ether-insoluble interface material is dissolved in benzene and set aside. Removal of solvent from the above ether extract gives 1.39 g. of crude quinotoxine as a dark red viscous oil.

*Example 10*

0.56 g. of the crude synthetic racemic quinotoxine is converted to the acid tartrate and fractionally crystallized from equal volume of water by seeding. The resulting material is more soluble and less easily crystallized than natural d-quinotoxine-d-tartrate. After four crystallizations the salt melts from 40° to 55° C., melting lower than the natural material. Regeneration gives quinotoxine with $[\alpha]_D = +13°$. When the acid tartrate is crystallized from absolute alcohol, a very small amount of the anhydrous salt, melting point 149–153° C. is obtained.

From the mother liquors impure quinotoxine-d-tartrate is recovered and the 44.4 mg. of partially resolved quinotoxine ($[\alpha]_D = +13°$) regenerated therefrom is converted to the neutral dibenzoyl-d-tartrate. The d-quinotoxine-dibenzoyl-d-tartrate crystallizes well from twice the weight of methyl alcohol, 30.2 mg. of salt, melting point 175–177° C., being obtained. After one further crystallization, pure d-quinotoxine-dibenzoyl-d-tartrate, melting point 184–185° C. is obtained (16.6 mg). No depression with natural d-quinotoxine-dibenzoyl-d-tartrate is observed.

From the relatively pure d-quinotoxine-dibenzoyl-d-tartrate there is obtained, upon regeneration, the pure di-quinotoxine having $[\alpha]_D = +44°$.

All mother liquors are then exhausted of isolatable d-quinotoxine, and are united and converted to the dibenzoyl-l-tartrate. After five recrystallizations, 34.6 mg. of l-quinotoxine-dibenzoyl-l-tartrate, melting point 185–186° C., are obtained. The pure l-quinotoxine is then regenerated from the latter compound.

Since certain changes in carrying out the above methods and in obtaining the various species of the invention may be made without departing from the scope thereof, it is intended that all matter contained in the above description shall be interpreted as illustrative and not in a limiting sense.

It is also to be understood that the following claim is intended to cover all the generic and specific features of the invention herein described, and all statements of the scope of the invention which, as a matter of language, might to said to fall therebetween.

What is claimed is:

As a new composition, an uramidohomomeroquinene having the formula

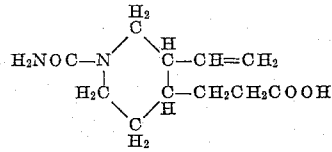

ROBERT BURNS WOODWARD.
WILLIAM von EGGERS DOERING.

REFERENCES CITED

The following references are of record in the file of this patent:

OTHER REFERENCES

Chem. Abstracts, vol. 4, pp. 2136–2138 (1910).
Berichte, vol. 51, pp. 466–467, 1360–1365 (Rabe) (1918).
Beilstein: Organische Chemie, Vierte Auflage, vol. 25, pp. 39–40 (1927).
Chem. Abstracts, vol. 26, pp. 1935–1936 (1932); citing: Annalen, vol. 492, 242–266.
Karrer: Organic Chemistry, Nordemann Pub. Co., pp. 798–801 (1938).